US011238015B2

(12) United States Patent
Lee (10) Patent No.: US 11,238,015 B2
(45) Date of Patent: Feb. 1, 2022

(54) INSTANT HYPER-V STREAMING (71) Applicant: Citrix Systems, Inc., Fort Lauderdale, FL (US)

(72) Inventor: Moso Lee, Nashua, NH (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 125 days.

(21) Appl. No.: 15/879,715

(22) Filed: Jan. 25, 2018

(65) Prior Publication Data

US 2019/0228087 A1 Jul. 25, 2019

(51) Int. Cl.
*G06F 16/188* (2019.01)
*G06F 12/0875* (2016.01)
*G06F 9/4401* (2018.01)
*G06F 16/11* (2019.01)

(52) U.S. Cl.
CPC .......... *G06F 16/196* (2019.01); *G06F 9/4401* (2013.01); *G06F 12/0875* (2013.01); *G06F 16/128* (2019.01); *G06F 2212/60* (2013.01)

(58) Field of Classification Search
None
See application file for complete search history.

(56) References Cited

U.S. PATENT DOCUMENTS

| | | | |
|---|---|---|---|
| 9,588,976 B1* | 3/2017 | Riel | G06F 3/0679 |
| 10,042,711 B1* | 8/2018 | Chopra | G06F 11/1456 |
| 10,055,303 B1* | 8/2018 | Kumar | G06F 16/134 |
| 2007/0283343 A1* | 12/2007 | Aridor | G06F 8/656 |
| | | | 717/174 |
| 2011/0191834 A1* | 8/2011 | Singh | G06F 17/00 |
| | | | 726/6 |
| 2011/0252208 A1* | 10/2011 | Ali | G06F 11/1451 |
| | | | 711/162 |
| 2012/0084775 A1* | 4/2012 | Lotlikar | H04L 67/1097 |
| | | | 718/1 |
| 2012/0109958 A1* | 5/2012 | Thakur | G06F 16/122 |
| | | | 707/737 |
| 2012/0191929 A1* | 7/2012 | Zietzke | G06F 9/45533 |
| | | | 711/162 |
| 2012/0297181 A1* | 11/2012 | Lee | G06F 9/4401 |
| | | | 713/2 |
| 2013/0132691 A1* | 5/2013 | Banga | G06F 21/53 |
| | | | 711/162 |
| 2015/0242283 A1* | 8/2015 | Simoncelli | G06F 11/1456 |
| | | | 711/162 |
| 2016/0140343 A1* | 5/2016 | Novak | G06F 21/575 |
| | | | 713/2 |
| 2017/0024260 A1* | 1/2017 | Chandrasekaran | G06F 8/63 |
| 2017/0068469 A1* | 3/2017 | Shankar | G06F 3/0617 |

\* cited by examiner

*Primary Examiner* — Sanjiv Shah
*Assistant Examiner* — Alexander J Yoon
(74) *Attorney, Agent, or Firm* — Foley & Lardner LLP (57) ABSTRACT

Described embodiments provide systems and methods for streaming a virtual disk. A first virtual hard disk (VHDX) file can be converted into a read-only VHDX file on a hypervisor. A second VHDX file can be created as a snapshot of the read-only VHDX file on the hypervisor. Partition globally unique identifiers (GUIDs) of the second VHDX file can be updated to be different from those of the read-only VHDX file. A provisioning services server executing on the hypervisor can stream the second VHDX file as a virtual disk over a virtual network established by the hypervisor, by booting the second VHDX file over the virtual network.

20 Claims, 4 Drawing Sheets

INSTANT HYPER-V STREAMING

FIELD OF THE DISCLOSURE

The present application generally relates to virtual machines, including but not limited to systems and methods for streaming content of a virtual disk.

BACKGROUND

Multiple virtual machines may be established by a hypervisor and execute on a single host physical computer, allowing each virtual machine to behave as if the virtual machine were a separate physical computer with distinct portions of the hardware of the host computer. A virtual disk of a virtual machine may be managed by a hypervisor as a virtual hard disk file. To establish a golden image of the virtual hard disk file as a shared virtual disk for streaming to one or more virtual machines, an existing virtual disk may have to go through disk cloning and/or a fixup process to create the shared virtual disk. This shared virtual disk creation process is a time-consuming task and this process usually has to be repeated whenever there is a significant update to the operating system of the existing virtual disk.

BRIEF SUMMARY

The present disclosure is directed towards systems and methods for streaming a virtual disk. Instead of using disk cloning to establish a shared virtual disk for purposes of streaming, a snapshot or image of a virtual hard disk file (e.g., a VHD, VHDX or other type of file) can be processed and/or updated by a hypervisor to be converted to a streaming capable VHDX file. Using the streaming capable VHDX file, a provisioning services engine/server hosted on the hypervisor can stream the VHDX file to one or more virtual machines (VMs) on the same host computer.

In one aspect, this disclosure is directed to embodiments of a method for streaming a virtual disk. The method may include converting a first virtual hard disk (VHDX) file into a read-only VHDX file on a hypervisor. The method may include creating a second VHDX file as a snapshot of the read-only VHDX file on the hypervisor. The method may include updating partition globally unique identifiers (GUIDs) of the second VHDX file to be different from those of the read-only VHDX file. A provisioning services server executing on the hypervisor may stream the second VHDX file as a virtual disk over a virtual network established by the hypervisor, by booting the second VHDX file over the virtual network.

In some embodiments, converting the first VHDX file into the read-only VHDX file can include creating a third VHDX file as a snapshot of the first VHDX file. The method can include mounting the second VHDX file after the updating. The method can include modifying a registry of an operating system (OS) for booting the second VHDX file, by updating an ordering of a network subsystem to begin earlier as compared to that prior to the updating. The method can include changing a local disk associated with the first VHDX file to a non-boot disk, and changing the second VHDX file to a boot disk. The method can include changing the local disk to a non-boot disk by updating partition GUIDs in boot configuration data. The method can include using the non-boot disk as a local write cache of the provisioning services server.

In certain embodiments, the method can include dismounting the second VHDX file prior to the booting. In some embodiments, streaming the second VHDX file can include streaming the second VHDX file to a plurality of virtual machines (VMs) hosted by the hypervisor. In certain embodiments, the second VHDX file is created without using disk cloning.

In another aspect, this disclosure is directed to embodiments of a system for streaming a virtual disk. The system can include a hypervisor. A first virtual hard disk (VHDX) file can be converted into a read-only VHDX file on the hypervisor. A second VHDX file can be formed by creating a second VHDX file as a snapshot of the read-only VHDX file on the hypervisor, and updating partition globally unique identifiers (GUIDs) of the second VHDX file to be different from those of the read-only VHDX file. The second VHDX file can be streamed by a provisioning services server executing on the hypervisor, as a virtual disk over a virtual network established by the hypervisor, by booting the second VHDX file over the virtual network.

In some embodiments, the first VHDX file is converted into the read-only VHDX file by creating a third VHDX file as a snapshot of the first VHDX file. The second VHDX file is mounted for updating purposes. A registry of an operating system (OS) can be modified for booting the second VHDX file, by updating an ordering of a network subsystem to begin earlier as compared to that prior to the updating. The first VHDX file may be associated with a local disk that is changed to a non-boot disk, and changing the second VHDX file to a boot disk. The local disk can change to a non-boot disk by at least updating partition GUIDs in boot configuration data. The non-boot disk can be used as a local write cache of the provisioning services server.

In certain embodiments, the second VHDX file is dismounted prior to the booting. The second VHDX file can be streamed as a virtual disk to a plurality of virtual machines (VMs) hosted by the hypervisor. The second VHDX file can be created without using disk cloning.

BRIEF DESCRIPTION OF THE FIGURES

The foregoing and other objects, aspects, features, and advantages of the present solution will become more apparent and better understood by referring to the following description taken in conjunction with the accompanying drawings, in which.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes a virtualized computing environment which may be useful for practicing embodiments described herein; and Section C describes systems and methods for streaming a virtual disk.

A. Computing Environment

Prior to discussing the specifics of embodiments of the systems and methods for running virtual machines by probing installation media, it may be helpful to discuss the computing environments in which such embodiments may be deployed.

Figure 1:
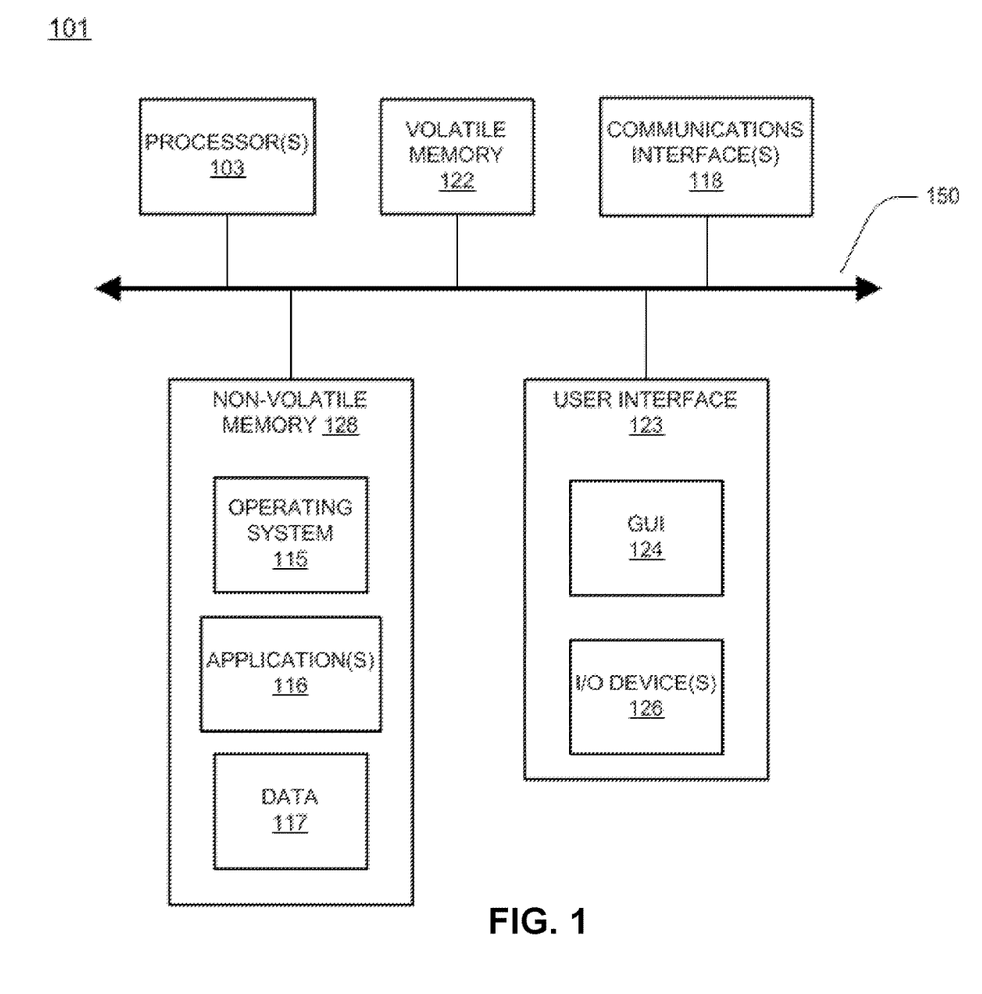
FIG. 1 is a block diagram of embodiments of a computing device.

As shown in FIG. 1, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1 is shown merely as an example, and can be a device of any type, and can be used to implement a client, server or appliance for instance.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, the computing device 101 may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Virtualized Computing Environment

Prior to discussing the specifics of embodiments of the systems and methods for running virtual machines by probing installation media, it may be also helpful to discuss the virtualized computing environments in which such embodiments may be deployed.

Figure 2:
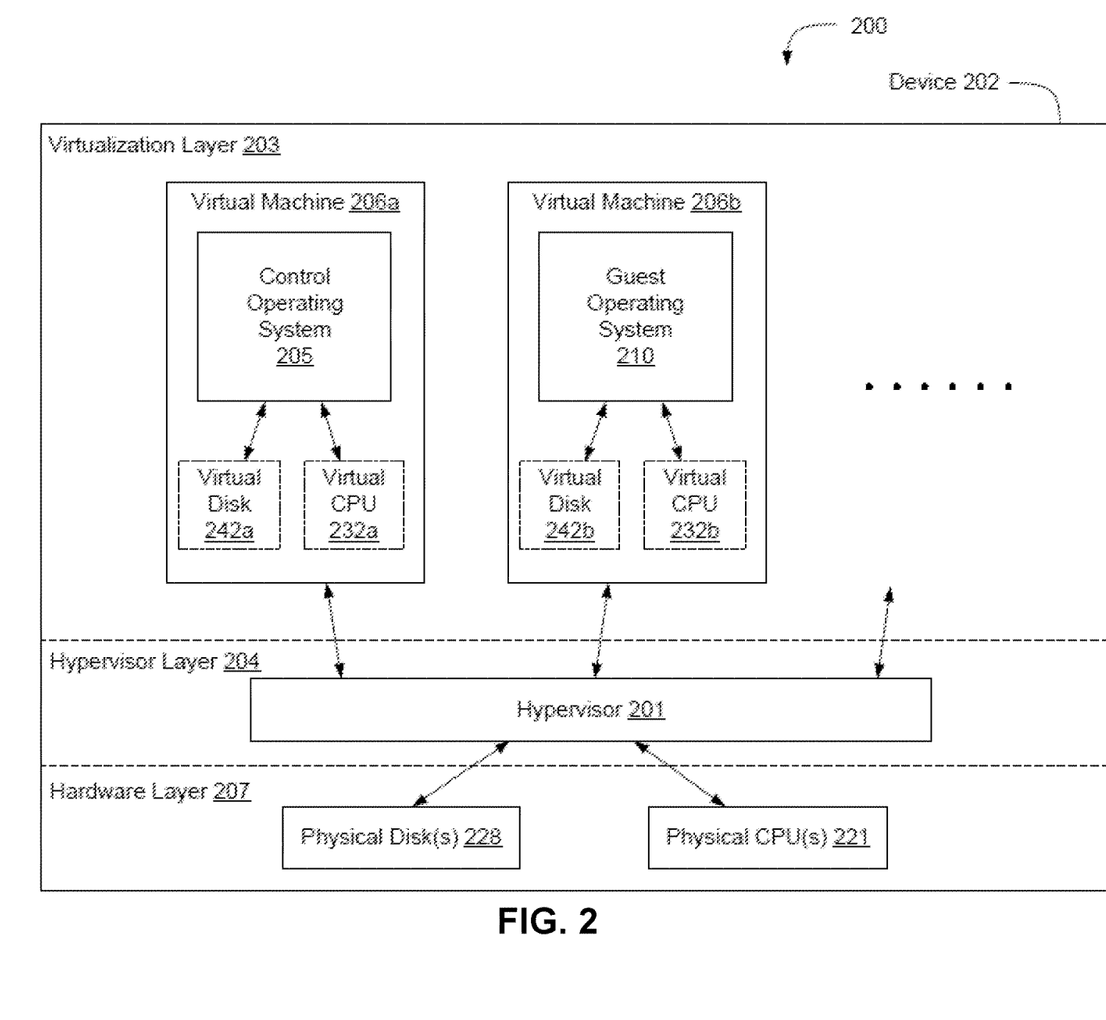
FIG. 2 is a block diagram of embodiments of a virtualized computing device.

Referring now to FIG. 2, a block diagram of a virtualized environment 200 is shown. As shown, a computing device 202 in a virtualized environment 200 includes a virtualization layer 203, a hypervisor layer 204, and a hardware layer 207. The computing device 202 can include any embodiment of features of computer 101 as discussed above in connection with FIG. 1 for example. Hypervisor layer 204 includes one or more hypervisors (or virtualization managers) 201 that allocates and manages access to a number of physical resources in hardware layer 207 (e.g., physical processor(s) 221 and physical disk(s) 228) by at least one virtual machine (VM) (e.g., one of VMs 206) executing in the virtualization layer 203. Each VM 206 may include allocated virtual resources such as virtual processors 232 and/or virtual disks 242, as well as virtual resources such as virtual memory and virtual network interfaces. In some embodiments, at least one of VMs 206 may include a control operating system (e.g., 205) in communication with hypervisor 201 and used to execute applications for managing and configuring other VMs (e.g., guest operating systems 210) on device 202.

In general, hypervisor(s) 201 may provide virtual resources to an operating system of VMs 206 in any manner that simulates the operating system having access to a physical device. Thus, hypervisor(s) 201 may be used to emulate virtual hardware, partition physical hardware, virtualize physical hardware, and execute virtual machines that provide access to computing environments. In an illustrative embodiment, hypervisor(s) 201 may be implemented as a XEN hypervisor, for example as provided by the open source Xen.org community. In an illustrative embodiment, device 202 executing a hypervisor that creates a virtual machine platform on which guest operating systems may execute is referred to as a host server. In such an embodiment, device 202 may be implemented as a XEN server as provided by Citrix Systems, Inc., of Fort Lauderdale, Fla.

Hypervisor 201 may create one or more VMs 206 in which an operating system (e.g., control operating system 205 and/or guest operating system 210) executes. For example, the hypervisor 201 loads a virtual machine image to create VMs 206 to execute an operating system. Hypervisor 201 may present VMs 206 with an abstraction of hardware layer 207, and/or may control how physical capabilities of hardware layer 207 are presented to VMs 206. For example, hypervisor(s) 201 may manage a pool of resources distributed across multiple physical computing devices.

In some embodiments, one of VMs 206 (e.g., the VM executing control operating system 205) may manage and configure other of VMs 206, for example by managing the execution and/or termination of a VM and/or managing allocation of virtual resources to a VM. In various embodiments, VMs may communicate with hypervisor(s) 201 and/or other VMs via, for example, one or more Application Programming Interfaces (APIs), shared memory, and/or other techniques.

In general, VMs 206 may provide a user of device 202 with access to resources within virtualized computing environment 200, for example, one or more programs, applications, documents, files, desktop and/or computing environments, or other resources. In some embodiments, VMs 206 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 2 as including a single virtualized device 202, virtualized environment 200 may include a plurality of networked devices in a system in which at least one physical host executes a virtual machine. A device on which a VM executes may be referred to as a physical host and/or a host machine. For example, a virtual appliance may be implemented in a virtualized environment 200 on any computing device, such as a client or server. Virtual appliances may provide functionality for availability, performance, health monitoring, caching and compression, connection multiplexing and pooling and/or security processing (e.g., firewall, VPN, encryption/decryption).

Additional details of the implementation and operation of virtualized computing environment 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Streaming a Virtual Disk

The present disclosure is directed towards systems and methods for streaming a virtual disk. Instead of using disk cloning to establish a shared virtual disk for purposes of streaming, a snapshot or image of a virtual hard disk file (e.g., a VHD, VHDX or other type of file) can be processed and/or updated by a hypervisor to be instantly or rapidly converted into a streaming capable VHDX file (or shared virtual disk) on the hypervisor. Using the streaming capable VHDX file, a provisioning services server hosted on the hypervisor can stream the VHDX file to one or more virtual machines (VMs) on the same host computer.

In some embodiments, the present solution can enable streaming of the shared virtual disk between the hypervisor and the one or more VMs over a virtual network. The virtual network can be formed or established on the host computer on which the hypervisor operates, and can include the one or more VMs, the hypervisor and/or the streaming capable VHDX file (or shared virtual disk). In some embodiments, the present solution can avoid a boot storm of competing physical network traffic, because the streaming is between the hypervisor and one or more VMs over the virtual network on the host computer. In some embodiments, the present solution can significantly reduce a hypervisor's storage requirement because one shared virtual disk can stream to multiple VMs. A user, such as an administrator, can continue to use or maintain a master VM (and its virtual disk) to manage version. When a new golden disk for sharing or streaming is to be established, the rapid/instant process of creating a shared virtual disk can be applied to the master VM's golden virtual disk. A virtual disk is sometimes referred to as a vdisk or vDisk in this disclosure.

Figure 3:
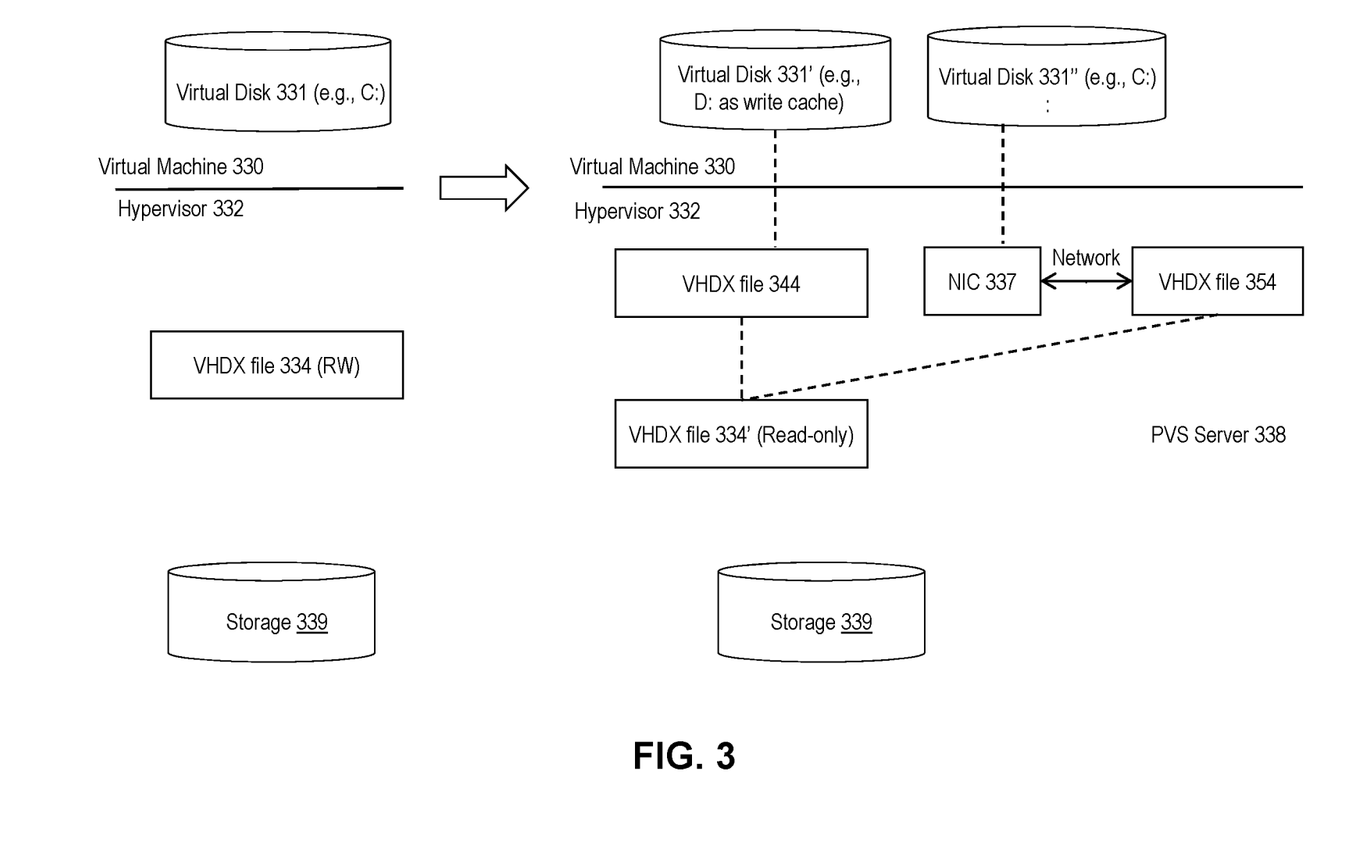
FIG. 3 is a block diagram of an embodiment of a system for streaming a virtual disk.

Referring to FIG. 3, one example embodiment of a system for streaming a virtual disk is depicted. The system can include a hypervisor 332 operating on one or more physical host machines. The system can correspond to device 202 of FIG. 2 for instance. The hypervisor 332 can establish and/or manage one or more VMs and each corresponding virtual disk. The hypervisor 331 can comprise or correspond to any type of hypervisor as described above in connection with FIG. 2 for instance. For example, hypervisor 332 can include a Hyper-V hypervisor by Microsoft Inc., for creating VMs on x86-64 hardware systems running on a Windows operating system for instance. The hypervisor 332 can include features of the hypervisor 201 described above in connection with FIG. 2 for instance.

The one or more VMs can include a first VM 330 which can be used as a master VM for instance. VM 330 can include a virtual disk (or vdisk) 331, which is sometimes referred to as a local disk and can include content such as an image of an operating system (OS), application files and/or user files. The virtual disk 331 can replicate a physical hard drive, and can include data and structural elements (e.g., disk partitions, files and folders) of the physical hard drive. The hypervisor can maintain or manage the vdisk 331 as a virtual hard disk (VHDX) file 334, which is a readable and writable (RW) file. The hypervisor may store or maintain the VHDX file 334 in a storage 339 of the hypervisor or physical host machine. The storage 339 can include any type or form of storage of the physical host machine, such as memory 128 or 122 as described above in connection with FIG. 1.

In accordance with some embodiments of the present systems and methods, typical disk cloning is not used, although certain step(s) in the disk cloning process may be adapted, modified and/or utilized in the present solution. Although various references to VHDX files and Hyper-V are made herein, these are merely illustrative and not intended to be limiting in any way. For example, embodiments of the present systems and methods can apply or be adapted for use with other types of hypervisors (e.g., native or embedded, from various vendors, such as Citrix XenServer, VMWare vSphere), and/or virtual hard disk files, such as VHD, virtual floppy disk (VFD), or virtual machine disk (VMDK) files.

Referring again to FIG. 3, the hypervisor and/or a provisioning services server 338 can create, generate or establish a VHDX file 344 which comprises a snapshot or image of the VHDX file 334. In creating the VHDX file 344, the VHDX file 334 (or parent VHDX file) becomes a read-only VHDX file 334'. The local disk is changed to a secondary virtual disk corresponding to vdisk 331', and can be used as a local write cache for a provisioning services (PVS) server 338 operating or hosted on the hypervisor. The vdisk 331' corresponds to the VHDX file 344, in some embodiments.

In some embodiments, a PVS server 338 includes software components or a server for providing, supporting or enabling streaming of a shared/master disk image. A vdisk can be created from a device/VM's disk by taking a snapshot of the OS and application image, and then storing that image as a vdisk file on the network. The vdisk can be assigned (and streamed) to multiple target devices/VMs in a standard image mode, for example. A PVS write cache can for instance be used to maintain or store disk writes of a target device when using a waste-protected vdisk (or standard image). When a target device/VM is activated, the a target device/VM can boot from the network and can download a boot file from a provisioning server. Based on the device boot configuration settings, a corresponding vdisk can be identified and mounted on the provisioning server and contents of the vdisk streamed to the target device/VM as needed (e.g., on demand, in real-time).

According to some embodiments of the present systems and methods, the hypervisor and/or PVS server 338 can create, generate or establish the VHDX file 354 as a snapshot or image of the read-only parent VHDX file 334'. The hypervisor and/or the PVS server 338 can run or perform a conversion process to inject or incorporate streaming functionality into the VHDX file 354. The hypervisor and/or the PVS server 338 can configure, update or modify the VM 330 to boot from a virtual network. The virtual network may be formed or established on the host computer on which the hypervisor operates, and can include the one or more VMs, the hypervisor and/or the streaming capable VHDX file 354 (or shared virtual disk 331").

In certain embodiments, the VHDX file 354 can be opened, reviewed and/or parsed in a VHDX parser. Partition globally unique identifiers (GUIDs), in a GUID partition table (GPT) of the VHDX file 354, can be updated, modified or changed to new ones, e.g., different from those of the read-only parent VHDX file 334'. This can ensure that a new vdisk 331" corresponding to the VHDX file 354 is different than the original local disk (virtual disk 331), so that operating system(s) of the virtual machine 330 and/or host machine can properly mount and distinguish these vdisks.

The VHDX file 354 can be mounted by an operating system, e.g., for updating or modification purposes. The corresponding vdisk 331" of VHDX file 354 is offline. An offline installation of provisioning services (PVS) drivers (e.g., PVS Windows drivers) can be performed on the offline vdisk image using a deployment image servicing and management (DISM) tool, e.g., DISM.exe. The DISM tool may include a command-line tool that can be used to service and prepare images (e.g., vdisk images), including for instance performing image clean-up, restoration, adding/removing components/drivers, or fixing corruptions. A PVS driver package that includes and/or results from the offline installation would piggyback changes that are not supported in a typical offline install.

Operating system registry (e.g., Windows registry) of VM 330 or vdisk 331" can be modified or updated to ensure that specific system component(s) would start early, for instance, a network subsystem of the VM's OS. For example, a custom or predetermined script or set of commands can be used to modify the OS registry.

Partition GUIDs of a GPT in the OS' boot configuration data (BCD) can be updated or modified. OS disk volume manager registry (e.g., Windows volume manager registry) can be updated or modified. One or more of these modifications can change the local disk (vdisk 331') to a non-boot disk, e.g., D: drive.

The VHDX file 354 can be dismounted responsive to the one or more updates/modifications discussed above. The VHDX file 354 can be ready to be streamed from PVS server 338. The PVS server 338 can be located on the hypervisor or physical host machine to avoid a boot storm (e.g., degradation of network performance when resources used for booting is overloaded) on a physical network interface.

The hypervisor and/or the PVS server 338 can initiate, start, control and/or manage streaming of content from the VHDX file 354 as a shared vdisk 331" over the virtual network. For instance, the VHDX file 354 may be booted and/or streamed via/using a network interface card (NIC) or network interface hardware 337 of the physical host machine, which is accessible to the hypervisor. The shared vdisk 331" corresponding to the VHDX file 354 can be streamed over the virtual network to one or more other VMs (e.g., client VMs). The Client VMs can boot directly cross the network, and can each behave as if it is running from its local drive.

In some embodiments, the present solution provides or supports a storage data path for streaming the shared vdisk 331" or VHDX file 354 to the network, without being restricted or limited by the hypervisor's storage system (e.g., storage 339) and/or the use of disk cloning. The ability to stream a vdisk allows the present system to provide value-add features instantly, such as allowing management of multiple streaming via a console or interface that is not limited to that of the hypervisor (e.g., of Microsoft Inc.'s Hyper-V), as well as allowing application layering via the streaming for example. The present solution can enable instant or rapid vdisk streaming that is in contrast with one based on a disk-cloning process.

Figure 4:
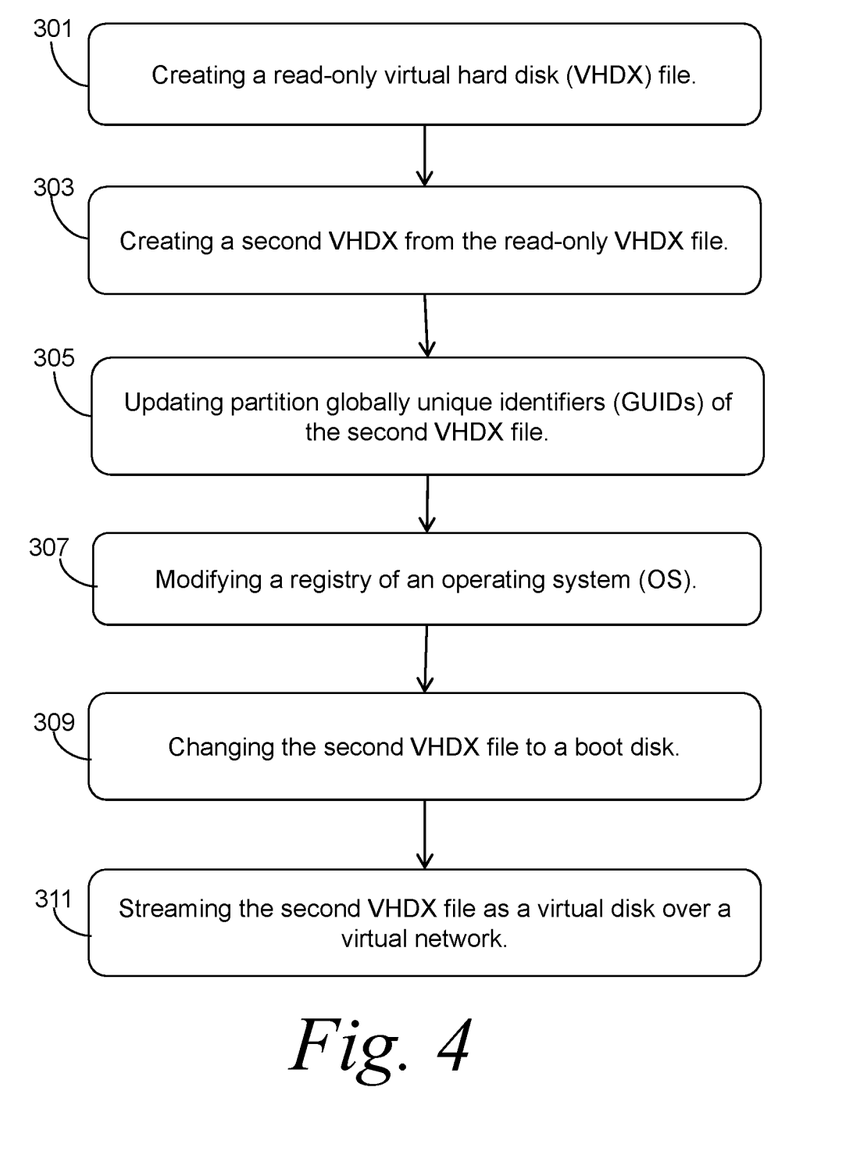
FIG. 4 is a flow diagram of an embodiment of a method for streaming a virtual disk.

Referring now to FIG. 4, a flow diagram depicting steps or operations in one embodiment of a method for streaming a virtual disk is shown. In brief summary, the method can include creating a read-only virtual hard disk (VHDX) file (301). A second VHDX can be created from the read-only VHDX file (303). Partition globally unique identifiers (GUIDs) of the second VHDX file may be updated (305). A registry of an operating system (OS) may be modified (307). The second VHDX file may be changed to a boot disk (309). The second VHDX file can be streamed as a virtual disk over a virtual network (311).

Referring now to (301), and in some embodiments, a read-only virtual hard disk (VHDX) file 334' is created. A hypervisor operating on a physical computing device can establish a plurality of VMs, including a first VM having a vdisk corresponding to a VHDX file 334. The hypervisor can maintain or manage the vdisk as the VHDX file, which may be a readable and writable (RW) file. The hypervisor may store or maintain the VHDX file 334 in a storage of the hypervisor or the physical host machine. The hypervisor and/or a PVS server can create, generate or establish a VHDX file 344 which comprises a snapshot or image of the VHDX file 334. In creating the VHDX file 344, the VHDX file 334 can become a read-only VHDX file 334'. The local disk (corresponding to vdisk 331') may be changed to a secondary virtual disk (instead of a master vdisk), and can be used as a local write cache for the PVS server 338 operating on the hypervisor, in some embodiments. The vdisk 331' corresponds to the VHDX file 344, in some embodiments.

Referring now to (303), and in some embodiments, a second VHDX 354 can be created from the read-only VHDX file. The hypervisor and/or the PVS server can create, generate or establish VHDX file 354 as a snapshot or image of the read-only parent VHDX file 334'. The hypervisor and/or PVS server 338 can run or perform a conversion process to inject or incorporate streaming functionality into the VHDX file 354. The hypervisor and/or PVS server can configure or modify the VM 330 to boot from network (e.g., from a virtual network). The virtual network may be formed or established on the host computer on which the hypervisor operates, and can include the one or more VMs, the hypervisor and/or the streaming capable VHDX file 354.

Referring now to (305), and in some embodiments, partition globally unique identifiers (GUIDs) of the second VHDX file 354 may be updated. In certain embodiments, the VHDX file 354 can be opened, reviewed and/or parsed in a VHDX parser. Partition globally unique identifiers (GUIDs), in a GUID partition table (GPT) of the VHDX file 354, can be updated, modified or changed to new ones, e.g., different from those of the read-only parent VHDX file 334'. This can ensure that a new vdisk 331" corresponding to the VHDX file 354 is different than the original local disk (virtual disk 331), so that operating system(s) of the virtual machine 330 and/or host machine can properly mount and distinguish these vdisks.

The VHDX file 354 can be mounted by an operating system, e.g., for updating or modification purposes. An offline installation of PVS drivers (e.g., PVS Windows drivers) can be performed on the offline vdisk image using a DISM tool, e.g., DISM.exe. A PVS driver package that includes and/or results from the offline installation would piggyback or carry changes that are not supported in a typical offline install.

Referring now to (307), and in some embodiments, a registry of an operating system (OS) may be modified. The OS registry (e.g., Windows registry) of VM 330 or vdisk 331" can be modified or updated to ensure that specific system component(s) would start early, for instance, a network subsystem of the VM's OS. For example, a custom or predetermined script or set of commands can be used to modify the OS registry. Partition GUIDs of a GPT in the OS' BCD can be updated or modified. At least part of an OS volume manager registry (e.g., Windows volume manager registry) can be updated or modified. One or more of these modifications can change the local disk (vdisk 331') to a non-boot disk, e.g., D: drive.

Referring now to (309), and in some embodiments, the second VHDX file 354 may be changed to a boot disk. The VHDX file 354 can be dismounted responsive to the one or more updates/modifications discussed above. The VHDX file 354 can be changed to a boot disk, and be ready to be streamed from the PVS server. The PVS server 338 can be located on the hypervisor or physical host machine to avoid a boot storm on a physical network interface.

Referring now to (311), and in some embodiments, the second VHDX file 354 can be streamed as a virtual disk over a virtual network. The hypervisor and/or the PVS server 338 can initiate, start, control and/or manage streaming of content from the VHDX file 354 as a shared vdisk 331" over the virtual network. For instance, the VHDX file 354 may be booted and/or streamed via/using a network interface card or hardware of the physical host machine, which is accessible to the hypervisor. The shared vdisk 331" corresponding to the VHDX file 354 can be streamed over the virtual network to one or more other VMs (e.g., client VMs). The client VI % can boot directly across the network, and can each behave as if it is running from its local drive.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for streaming, the method comprising:
converting, by a hypervisor, a first virtual hard disk (VHDX) file having a first globally unique identifier (GUID) partition table (GPT), into a read-only VHDX file;
creating, on the hypervisor, a second VHDX file including a second GPT, as a snapshot of the read-only VHDX file to incorporate streaming functionality for booting over a virtual network established by the hypervisor;
updating the second GPT of the second VHDX file to be different from the first GPT by updating globally unique identifiers (GUIDs) of the second GPT of the second VHDX file, to be different from those of the read-only VHDX file; and
streaming, by a provisioning services server executing on the hypervisor, according to the streaming functionality, the second VHDX file as a virtual disk over the virtual network, by booting the second VHDX file over the virtual network using the updated GUIDs of the second GPT.

2. The method of claim 1, wherein converting the first VHDX file into the read-only VHDX file comprises creating a third VHDX file as a snapshot of the first VHDX file.

3. The method of claim 1, further comprising mounting the second VHDX file for updating.

4. The method of claim 3, further comprising dismounting the second VHDX file prior to the booting.

5. The method of claim 1, further comprising modifying a registry of an operating system (OS) for booting the second VHDX file, by updating an ordering of a network subsystem.

6. The method of claim 1, further comprising changing a local disk associated with the first VHDX file to a non-boot disk, and changing the second VHDX file to a boot disk.

7. The method of claim 6, further comprising changing the local disk to the non-boot disk by updating the GUIDs in boot configuration data.

8. The method of claim 7, further comprising using the non-boot disk as a local write cache of the provisioning services server.

9. The method of claim 1, wherein streaming the second VHDX file comprises streaming the second VHDX file to a plurality of virtual machines (VMs) hosted by the hypervisor.

10. The method of claim 1, wherein the second VHDX file is created without using disk cloning.

11. A system for streaming, the system comprising:
one or more processors;
a hypervisor executing on the one or more processors;
a first virtual hard disk (VHDX) file having a first globally unique identifier (GUID) partition table (GPT), configured to be converted, by the hypervisor, into a read-only VHDX file; and
a second VHDX file:
configured to be formed by creating, on the hypervisor, the second VHDX file including a second GPT, as a snapshot of the read-only VHDX file to incorporate streaming functionality for booting over a virtual network established by the hypervisor, and updating the second GPT of the second VHDX file to be different from the first GPT by updating globally unique identifiers (GUIDs) of the second GPT of the second VHDX file to be different from those of the read-only VHDX file; and
configured to be streamed by a provisioning services server executing on the hypervisor, according to the streaming functionality, as a virtual disk over the virtual network, by booting the second VHDX file over the virtual network using the updated GUIDs of the second GPT.

12. The system of claim 11, wherein the first VHDX file is converted into the read-only VHDX file by creating a third VHDX file as a snapshot of the first VHDX file.

13. The system of claim 11, wherein the second VHDX file is configured to be mounted for updating.

14. The system of claim 13, wherein the second VHDX file is configured to be dismounted prior to the booting.

15. The system of claim 11, wherein a registry of an operating system (OS) is modified for booting the second VHDX file, by updating an ordering of a network subsystem.

16. The system of claim 11, wherein the first VHDX file is associated with a local disk that is changed to a non-boot disk, and changing the second VHDX file to a boot disk.

17. The system of claim 16, wherein the local disk is configured to change to the non-boot disk by at least updating the GUIDs in boot configuration data.

18. The system of claim 17, wherein the non-boot disk is configured to be used as a local write cache of the provisioning services server.

19. The system of claim 11, wherein the second VHDX file is configured to be streamed as the virtual disk to a plurality of virtual machines (VMs) hosted by the hypervisor.

20. The system of claim 11, wherein the second VHDX file is created without using disk cloning.

* * * * *